United States Patent
Ku (10) Patent No.: US 9,800,442 B2
(45) Date of Patent: Oct. 24, 2017

(54) ESTIMATING METHOD, SAMPLING FREQUENCY OFFSET CALCULATING METHOD, AND PHASE ESTIMATING METHOD AND DEVICE

(71) Applicant: MStar Semiconductor, Inc., Hsinchu Hsien (TW)

(72) Inventor: Yu-Hsien Ku, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/989,885

(22) Filed: Jan. 7, 2016

(65) Prior Publication Data

US 2016/0218857 A1    Jul. 28, 2016

(30) Foreign Application Priority Data

Jan. 28, 2015   (TW) ............................. 104102812 A (51) Int. Cl.
*H04L 27/26* (2006.01)

(52) U.S. Cl.
CPC .................... *H04L 27/26* (2013.01)

(58) Field of Classification Search
CPC ................................. H04L 7/0054
See application file for complete search history.

(56) References Cited

U.S. PATENT DOCUMENTS

| | | | | |
|---|---|---|---|---|
| 5,809,009 A * | 9/1998 | Matsuoka | ................. | H03J 7/02 370/206 |
| 6,785,349 B1 * | 8/2004 | Rosenlof | ........... | H04L 25/03159 375/260 |
| 7,062,282 B2 * | 6/2006 | Liu | ........................ | H04L 7/042 370/206 |
| 7,974,329 B2 * | 7/2011 | Huang | ................ | H04L 27/2656 370/203 |
| 8,582,676 B1 * | 11/2013 | Zhang | ................. | H04L 27/2657 375/260 |
| 2009/0028252 A1 * | 1/2009 | Lu | ....................... | H04L 27/2656 375/260 |

(Continued)

FOREIGN PATENT DOCUMENTS

| CN | 101809930 A | 8/2010 |
|---|---|---|
| CN | 102137056 A | 7/2011 |

(Continued)

OTHER PUBLICATIONS

TIPO Office Action, Jun. 13, 2016, 6 pages.
TIPO Office Action, Oct. 12, 2016, 3 pages.

*Primary Examiner* — Kenneth Lam
(74) *Attorney, Agent, or Firm* — Edell, Shapiro & Finnan, LLC (57) ABSTRACT

An estimating method for estimating a phase difference of two frames is provided. The estimating method includes: providing a first sequence according to a header of a first frame; providing a second sequence according to a header of a second frame, wherein the first and second frames are successive frames, and the first and second sequences are pseudo noise sequences; performing a correlation calculation according to the first and second sequences to generate a plurality of correlation values; and estimating the phase difference between the first and second frames according to the correlation values.

10 Claims, 8 Drawing Sheets

(56) References Cited

U.S. PATENT DOCUMENTS

| | | | | |
|---|---|---|---|---|
| 2009/0060101 A1* | 3/2009 | Liu | ............... | H04L 25/0212 375/344 |
| 2010/0034300 A1* | 2/2010 | Xiang | ............. | H04L 27/2605 375/260 |
| 2011/0280348 A1* | 11/2011 | Li | ............... | H04L 27/0014 375/343 |
| 2012/0163507 A1* | 6/2012 | Wang | ............. | H04L 27/0014 375/340 |
| 2012/0242324 A1* | 9/2012 | Sasahara | ......... | H04L 27/2278 324/76.19 |
| 2012/0300881 A1* | 11/2012 | Kishimoto | ...... | H04L 27/0014 375/326 |
| 2013/0121323 A1* | 5/2013 | Lilleberg | ......... | H04L 1/1845 370/338 |
| 2014/0185717 A1* | 7/2014 | Lee | ............... | H04L 27/2675 375/343 |

FOREIGN PATENT DOCUMENTS

| | | |
|---|---|---|
| TW | I271074 | 1/2007 |
| TW | 201116071 A | 5/2011 |

\* cited by examiner

| | | | | | | | | | | | | |
|---|---|---|---|---|---|---|---|---|---|---|---|---|
| FH0 | 0 | 1 | 2 | 3 | ... | 253 | 254 | 0 | 1 | 2 | 3 | ... 163 164 |
| FH1 | 1 | 2 | 3 | 4 | ... | 254 | 0 | 1 | 2 | 3 | 4 | ... 164 165 |
| FH2 | 254 | 0 | 1 | 2 | ... | 252 | 253 | 254 | 0 | 1 | 2 | ... 162 163 |
| FH3 | 2 | 3 | 4 | 5 | ... | 0 | 1 | 2 | 3 | 4 | 5 | ... 165 166 |
| FH4 | 253 | 254 | 0 | 1 | ... | 251 | 252 | 253 | 254 | 0 | 1 | ... 161 162 |

ESTIMATING METHOD, SAMPLING FREQUENCY OFFSET CALCULATING METHOD, AND PHASE ESTIMATING METHOD AND DEVICE

This application claims the benefit of Taiwan application Serial No. 104102812, filed Jan. 28, 2015, the subject matter of which is incorporated herein by reference.

BACKGROUND OF THE INVENTION

Field of the Invention

The invention relates in general to a phase difference estimating method and device, a sampling frequency offset calculating method and device, and a phase estimating method and device, and more particularly to a method and device applicable to a signal receiver of a digital terrestrial broadcast system.

Description of the Related Art

In general, after a receiver receives a packet of a wireless signal, the header of a frame of the signal needs to be parsed to learn the data transmission format and associated information, and a sampling frequency offset (SFO) needs to be calculated to retrieve contents of the frame according to a correct timing. Taking a Digital Terrestrial Multimedia Broadcast (DTMB) system for example, the format of the frame header may be PN420, PN945 or PN595, where the code "PN" represents "pseudo noise", and the values 420, 945 and 595 are associated with the header lengths. In current technologies, the format of the frame header, the phase of the frame and the SFO are independently determined, and the determination results are combined for a subsequent process (e.g., a timing recovery process and a channel estimation process). However, the above approach of performing the determinations by multiple independent modules are quite costly, and needs to be improved for cost considerations.

More details of the prior art can be obtained from publications, including the Taiwan Patent Application "Method for Detecting Frame Transmission Mode and Method for Synchronizing Frames" (Publication No.: 201116071), and the China Patent Application "Method for Detecting Phase of Pseudo Noise Sequences" (Publication No.: CN102137056A).

SUMMARY OF THE INVENTION

It is an object of the present invention to provide an estimating method, a phase estimating method and device, and a sampling frequency offset (SFO) calculating method to improve the prior art.

The present invention discloses an estimating method for estimating a phase difference between two frames. The estimating method is applicable to a signal receiver of a digital terrestrial broadcast system. The estimating method according to an embodiment includes: providing a first sequence according to the header of a first frame; providing a second sequence according to the header of a second frame, wherein the first and second frames are successive frames, and the first and second sequences are pseudo noise sequences; performing a correlation calculation according to the first and second sequences to accordingly generate a plurality of correlation values; and estimating the phase difference between the first and second frames according to the correlation values.

The present invention further discloses a sampling frequency offset (SFO) calculating method that calculates an SFO according to a phase difference. The SFO calculating method according to an embodiment includes: generating phase differences between every two successive frames of a plurality of frames, wherein the header of each of the frames includes a sequence, and the sequences have different phases but the same contents; and calculating the SFO according to the phase differences of all successive frames of the plurality of frames.

The present invention further discloses a phase estimating method that estimates a phase of a frame according to a phase difference and an SFO. The phase estimating method is applicable to a signal receiver of a digital terrestrial broadcast system, and the signal receiver receives a received signal including a plurality of frames. The phase estimating method according to an embodiment includes: estimating the phase differences between every two successive frames of the frames; calculating an SFO according to the phase differences; correcting the phase differences according to the SFO to obtain a plurality of corrected phase differences; and calculating the phase of each of the frames according to the corrected phase differences.

The present invention correspondingly discloses a phase estimating device that performs the above phase estimating method. The phase estimating method according to an embodiment includes: a phase difference estimating circuit, that estimates phase differences between every two successive frames of the frames; a calculating circuit, that calculates an SFO according to the phase differences; a phase difference correcting circuit, that corrects the phase differences according to the SFO to obtain a plurality of corrected phase differences; and a phase estimating circuit, that calculates the phase of each of the frames according to the corrected phase differences.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The application discloses a phase difference estimating method and device, a sampling frequency offset (SFO) calculating method and device, and a phase estimating method and device for estimating a phase difference between two frames, calculating the SFO according to the phase difference, and estimating the phase of a frame according to a phase difference and an SFO, respectively. The processes of estimating the phase, calculating the SFO and estimating the phase of a frame can be jointly or independently performed. The application is applicable to an integrated circuit (e.g., a demodulation circuit) or a system device (e.g., a fixed or handheld multimedia broadcast signal processing device), and is at least applicable to a signal receiver of a digital terrestrial broadcast system, such as a Digital Terrestrial Multimedia Broadcast (DTMB) system. The methods of the disclosure may be in form of software and/or firmware, and may be performed by an integrated circuit or a combination of a plurality of independent circuits. The devices of the disclosure or equivalent devices may perform the methods of the disclosure or equivalent methods. Further, a part of the elements included in the devices of the disclosure may be individually known elements. Without affecting the full disclosure and possible implementation of the device, details of the known elements are omitted. In possible implementation, one skilled person in the art would selectively implement part or all technical features of any embodiment of the application or selectively combine part or all technical features of the embodiments of the application to increase the flexibility of the disclosure.

Figure 1:
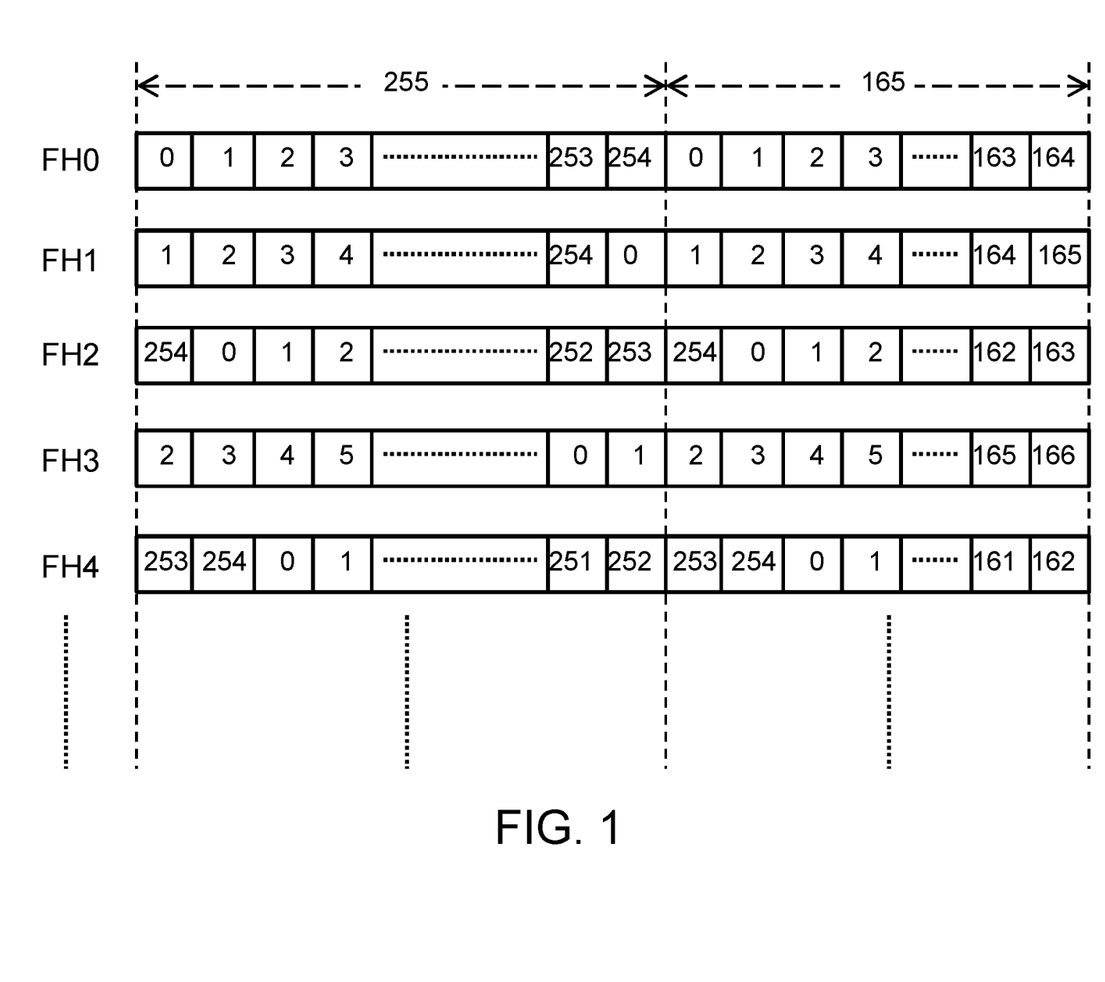
FIG. 1 is a schematic diagram of a cyclic pattern according to which the phase of PN420 frames of a DTMB system changes.
Figure 2:
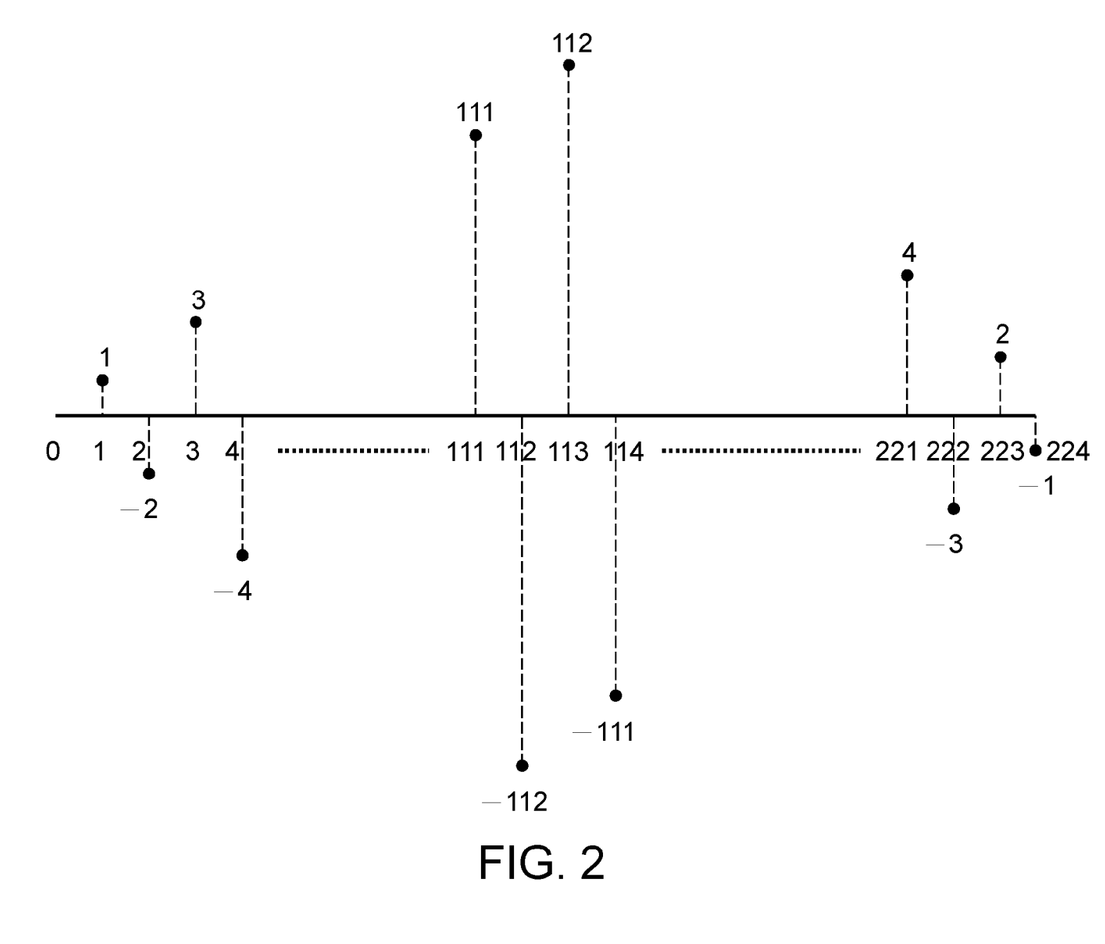
FIG. 2 is a schematic diagram of a phase difference between two successive frames in FIG. 1.

For better understanding, a DTMB system is taking as an example in the following description. However, in possible implementation, the disclosure is applicable to other systems. Types of the frame headers of a DTMB system include PN420, PN945 and PN595, wherein header contents of PN420 and PN945 are cyclically changed according to an order of the frames, and header contents of PN595 are fixed. For example, referring to FIG. 1 and FIG. 2, FIG. 1 shows a cyclic pattern according to which the phase of PN420 header frames changes. The frame headers include frame headers 0, 1, 2, 3, 4, . . . (referred to as FH0, FH1, FH2, FH3, FH4 . . . ). Each frame header includes 255 bits (e.g., bits 0 to 254 indicated in the frame header 0) and 165 repeated bits (e.g., bits 0 to 164 indicated in the frame header 0). These 255 bits and 165 bits form a 420-bit pseudo noise sequence. Such is generally known in the technical field, and associated details are omitted herein. Further, the phase difference between two successive frames is also depicted in FIG. 2, with the horizontal axis representing the order of the frames (as a frame 0 to a frame 224 in FIG. 2), and the vertical axis representing the theoretical phase difference (e.g., phase differences 0, 1, −2, 3, −4, . . . , 111, −112, 112, −111, . . . , 4, −3, 2, 1 in FIG. 2). For example, the theoretical phase difference between the frame 0 and the frame 1 is 1, and the theoretical phase difference between the frame 1 and the frame 2 is −2. Similarly, such is generally known in the technical field, and associated details are omitted herein. For illustration purposes, processing PN420 frames is given as an example in the embodiments. In possible implementation, the disclosure may process other types of frames.

Figure 3:
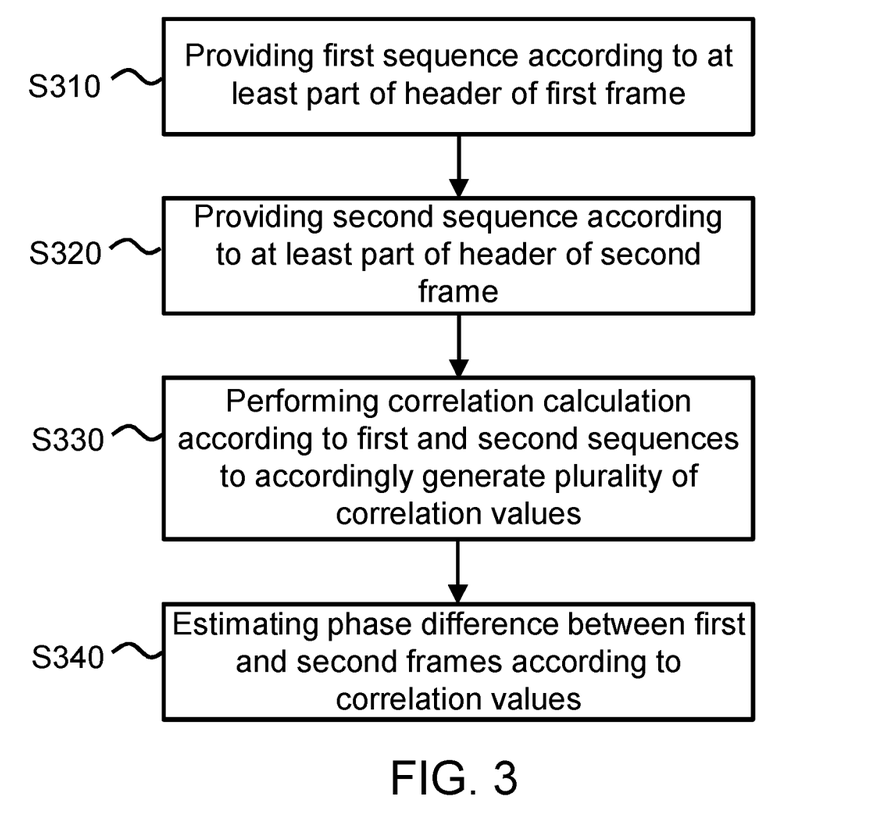
FIG. 3 is a flowchart of a phase difference estimating method according to an embodiment of the present invention.

As previously described, a signal received at a signal receiving end of a DTMB system includes a plurality of frames. To detect the phase of a frame in the signal, in the present invention, a phase difference between two successive frames (at this point, the type and position of the frame are known through any available frame mode detection technology, and associated details are not technical features of the present invention and can be learned from the prior art), an SFO is calculated according to the estimated phase difference, the phase difference is corrected according to the calculated SFO, and the phase of the frame is calculated according to the corrected phase difference. FIG. 3 shows a schematic diagram of a phase difference estimating method according to an embodiment of the present invention. Referring to FIG. 3, the phase difference estimating method includes following steps.

In step S310, a first sequence is provided according to at least a part of a header of a first frame. For example, in this step, according to a part of bits (e.g., 255 bits) of a PN420 frame header, these bits or bits derived from these bits (e.g., 2 raised to a power of a predetermined number of bits, such as 1024 bits) are provided as the first sequence. The derived bits may be obtained by up-sampling a part of bits of the header, by up-sampling a part of bits of the header and duplicating the up-sampled bits, or by up-sampling a part of bits of the header and filling predetermined bits (e.g., 0) to the up-sampled bits. The above variations are to be encompassed within the scope of the present invention.

In step S320, a second sequence is provided according to at least a part of a header of a second frame. The first and second frames are successive frames, and the first and second sequences are pseudo noise sequences. For example, in this step, according to a part of bits (e.g., 255 bits) of the header of a next PN420 frame (corresponding to the frame in step S310), the same bits or derived bits (e.g., 2 raised to a predetermined number of power of bits, such as 1024 bits) are provided as the second sequence. The details for generating the above derived bits are as given in the description of step S310. For a pseudo noise sequence x[m] having a cycle N, due to the cyclic repetition, the sequence x[m] is equal to the sequence x[m+N], and the correlation of the same sequences is the highest, where the variable m satisfies 0≤m≤N−1, with each m value corresponding to one bit value of the sequence x[m]. In step S330 below, the characteristic of a pseudo noise sequence is utilized for a correlation calculation. Details associated with pseudo noise sequences can be referred from Chapter 13-2-4 of "Digital Communications" by John G. Proakis (Publisher: MaGraw-Hill Higher Education, 2001), or other publications containing associated technologies.

In step S330, a correlation calculation is performed according to the first and second sequences to accordingly generate a plurality of correlation values. For example, the first sequence and the second sequence have N bits with the same contents but different phases. N correlation values $R_{AB}[n]$ can be obtained by performing a correlation calculation according to the first and second sequences, where n is an integer between 0 and N−1. More specifically, $R_{AB}[n]$ is caused to represent "in the first sequence (corresponding to the symbol A) and the second sequence (corresponding to the symbol B), a correlation value corresponding to an offset with a value n" or represent "in the first sequence, a correlation value corresponding to an offset with a value n", where $x_A$ represents the first sequence, and $x_B$ represents the second sequence. Based on the above, the correlation value $R_{AB}[n]$ may be represented by an equation below:

$$R_{AB} = \text{Circular convolution}(x_A, x_B)$$

In the above, $R_{AB}$ is an output of circular convolution. It is assumed that, $x_A[n]=s[[n]_N]*h[n]$, and $x_B[n]=s[[n-\Delta]_N]*h$

[n], "s" is a transmitted signal, "*" is a convolution operator, and "h" is the channel impulse response. The equation below is deduced:

$$R_{AB}[n]=s[[n]_N]*h[n]*\{s[[-n+\Delta]_N]*h^*[-n]\}=R_s[n-\Delta]*R_h[n]$$

Assuming that, $R_s[n] \approx \delta[n]$, $\delta[n]$ is equal to 1 (when n=0) or 0 (when n≠0), the equation below is deduced:

$$R_{AB}[n] = \sum_{m=0}^{N-1} x_A[m] x_B^*[[m+n]_N] = IFFT(X_A[k] X_B^*[k])$$

In the above equation, $X_i[k]$=FFT[$x_i[n]$], i=A, B, FFT refers to Fast Fourier transform, IFFT refers to inverse Fast Fourier transform, $x_A[[m]_N] \equiv x_A[(m \bmod N)]$, and modulo refers to a modulation operation.

In step S340, the phase difference between the first and second frames is estimated according to the plurality of correlation values. For example, in this step, the phase difference between the first and second frames may be estimated according to the value n corresponding to a maximum value in squares, absolute values or equivalent operation values of the plurality of correlation values. Further, the offset n corresponding to the maximum value of the correlation values is the phase difference between the first and second frames.

Figure 4:
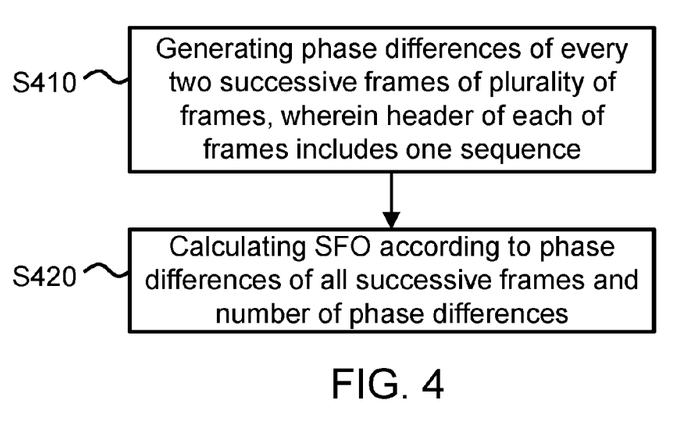
FIG. 4 is a flowchart of a sampling frequency offset (SFO) calculating method according to an embodiment of the present invention.

After the phase difference between the successive frames is obtained according to the above steps, the SFO calculating method of the present invention may then calculate the SFO according to the phase differences obtained from above, or according to phase differences obtained from other methods. More specifically, as shown in FIG. 4, the SFO calculating method according to an embodiment of the present invention includes following steps.

In step S410, individual phase differences between every two successive frames of a plurality of frames are generated. The header of each of the frames includes a sequence. For example, the sequences, e.g., pseudo noise sequences, have different phases but the same contents. For example but not limited to, the step may include the steps of the foregoing phase difference estimating method.

In step S420, an SFO is calculated according to the phase differences between every two successive frames of the plurality of frames. For example, assuming there are W phase differences, which are sequentially PD1 to PDW, the SFO is calculated as follows:

SFO=(PD1+PD2+ . . . +PDW)/$W$

For another example, assume that the frame processed in step S410 is a PN420 frame of a DTMB system, and 225 PN420 frames form a super frame. Theoretically, without any SFO, a sum of the phase differences of all successive frames in the super frame is 0 (referring to FIG. 2). However, if the plurality of frames processed in step S410 are not the above super frame or an equivalent frame, the sum of the phase differences of all successive frames of the frames may not be 0 (or may be 0) and contain a bias. At this point, the bias is expectantly subtracted in the calculation of the SFO in order to correctly reflect the SFO. That is:

SFO=[(PD1+PD2+ . . . +PDW)−bias]/$W$

In the above equation, the bias may be deduced from the type of frames and the cyclic change of the theoretical phase differences. For example, when the phase differences are PD1, PD2, PD3 and PD4, the sum of the theoretical phase differences is 1+(−2)+3+(−4)=−2. At this point, the bias is −2. The calculation for the bias may be summarized as follows.

(I) Assume that the number W of phase differences is an even number, and the absolute values of the phase differences display an increasing relationship. As such, the bias is −(W/2) if the first phase difference is a positive value, or the bias is (W/2) if the first phase difference is a negative value.

(II) Assume that the number W of phase differences is an even number, and the absolute values of the phase differences display a decreasing relationship. As such, the bias is (W/2) if the first phase difference is a positive value, or the bias is −(W/2) if the first phase difference is a negative value.

(III) Assume that the number W of phase differences is an odd number, and the absolute values of the phase differences display an increasing relationship. As such, the bias is −[(W−1)/2]+PDW if the first phase difference is a positive value, or the bias is [(W−1)/2]+PDW if the first phase difference is a negative value.

Figure 5:
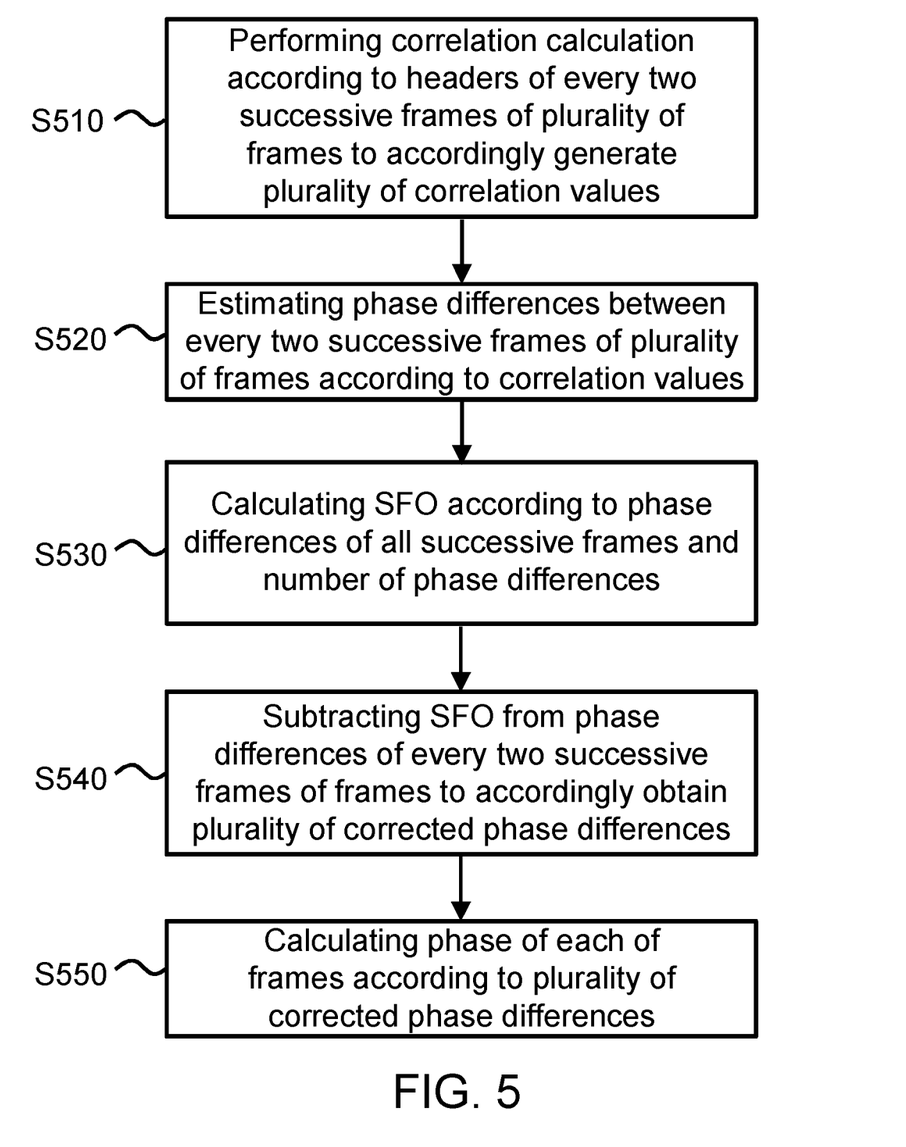
FIG. 5 is a flowchart of a phase estimating method according to an embodiment of the present invention.

(IV) Assume that the number W of phase differences is an odd number, and the absolute values of the phase differences display a decreasing relationship. As such, the bias is [(W−1)/2]+PDW if the first phase difference is a positive value, or the bias is −[(W−1)/2]+PDW if the first phase difference is a negative value When the SFO calculation is complete, the phase estimating method of the present invention may estimate the phase according to the foregoing phase differences and SFO, or according to phase differences and SFO obtained according to other methods. More specifically, as shown in FIG. 5, the phase estimating method according to an embodiment of the present invention includes following steps.

In step S510, a correlation calculation is performed according to headers of every two successive frames of a plurality of frames to accordingly generate a plurality of correlation values. Specific examples of this step may be learned from steps S310 to S330.

In step S520, individual phase differences between every two successive of the frames are estimated according to the correlation values. Specific details of this step may be learned from step S340.

In step S530, an SFO is calculated according to the phase differences between all successive frames and the number of the phase differences. Specific details of this step may be learned from step S420.

In step S540, the SFO is subtracted from the individual phase differences of every two successive frames of the plurality of frames to obtain a plurality of corrected phase differences. For example, assuming that the phase differences obtained in step S520 are PD1, PD2 , . . . , and PDN, and the SFO obtained in step S530 is SFO, the corrected phase differences (PD1$_{cal}$, PD2$_{cal}$, . . . , and PDN$_{cal}$) in this step may be obtained according to equations below:

PD1$_{cal}$=PD1−SFO

PD2$_{cal}$=PD2−SFO

PDN$_{cal}$=PDN−SFO

In step S550, the phase of each of the plurality of frames is calculated according to the corrected phase differences. For example, in this embodiment, PN 420 frames are adopted, and the K$^{th}$ corrected phase difference is represented by PDK$_{cal}$. Thus, the phase (P$_K$) of the K$^{th}$ frame is:

P$_K$=(−1)×(PDK$_{cal}$+1)/2—this equation is suitable for situations where PDK$_{cal}$ is an odd number; and $P_K=(-1)\times(PDK_{cal})/2$—this equation is suitable for situations where $PDK_{cal}$ is an even number.

It should be noted that, the steps in FIG. 3 to FIG. 5 as well as the continuation of the embodiments may be controlled by a state finite machine or an equivalent technology. The finite state machine can be implemented by one person skilled in the art based on the teaching of the disclosure, and the associated details are omitted herein. In the phase difference estimating method in FIG. 3, the accuracy of the phase difference estimation is associated with a carrier frequency offset (CFO). Thus, the phase difference estimating method may first determine whether to perform the phase difference estimating steps S310 to S340 according to any available CFO estimating technology before performing phase difference estimation. More specifically, the method in FIG. 3 may further include steps of: determining whether a CFO is lower than a threshold; and when the CFO is lower than the threshold, generating the correlation values according to the first and second sequences. Similarly, the step of determining the CFO may be controlled by the foregoing finite state machine or an equivalent technology. If the CFO exceeds a tolerable range, the state finite machine may select other mechanisms to perform the phase difference estimation. Such part is not a focus of the present invention, and shall not be further discussed.

Figure 6:
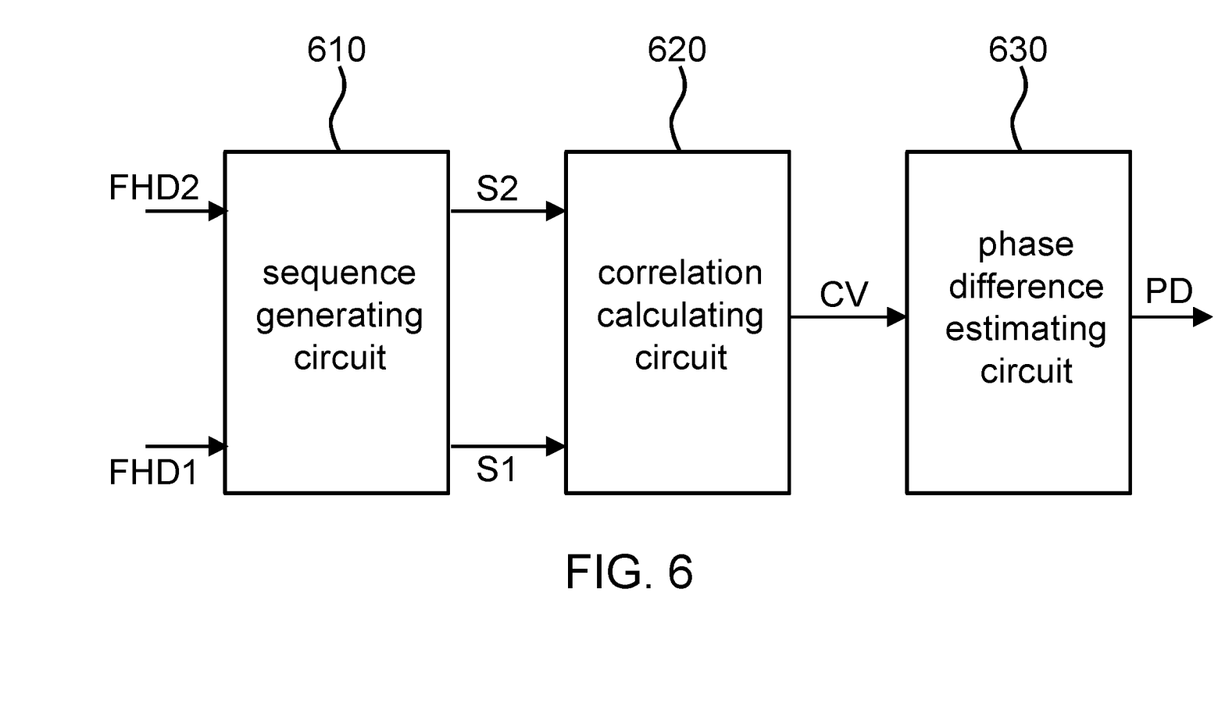
FIG. 6 is a schematic diagram of a phase difference estimating device according to an embodiment of the present invention.

In addition to the foregoing methods, the disclosure correspondingly discloses a phase estimating device, an SFO calculating device and a phase estimating device that are capable of performing the foregoing phase difference estimating method or an equivalent method, the foregoing SFO calculating method or an equivalent method, and the foregoing phase estimating method or an equivalent method. FIG. 6 shows a schematic diagram of a phase difference estimating device 600 according to an embodiment of the present invention. The phase difference estimating device 600 includes a sequence generating circuit 610, a correlation calculating circuit 620, and a phase difference estimating circuit 630. The sequence generating circuit 610 provides a first sequence (denoted as S1 in the diagram) according to at least a part of the header (denoted as FHD1 in the diagram) of a first frame, and a second sequence (denoted as S2 in the diagram) according to at least a part of the header (denoted as FHD2 in the diagram) of a second frame. The first and second frames are successive frames, and the first and second sequences are pseudo noise sequences. For example, the sequence generating circuit 610 may be an up-sampling and duplicating circuit that generates the derived bits in steps S310 and S320. More specifically, the sequence generating circuit 610 performs up-sampling according to at least a part (e.g., 255 bits) of a header to obtain up-sampled bits (e.g., 255×2 bits), and duplicates at least a part (e.g., duplicating 257 bits from the first bit of the up-sampled bits in a forward direction, and duplicating 257 bits from the last bit of the up-sampled bits in a reverse direction) to form derived bits with the original up-sampled bits (e.g., 255×2+257+257=1024 bits).

The correlation calculating circuit 620 performs a correlation calculation according to the first and second sequences to accordingly generate a plurality of correlation values (denoted as CV in the diagram). For example, the correlation circuit 620 performs the calculation in step S330 or an equivalent calculation. In one embodiment, the correlation circuit 620 includes: two Fast Fourier transform (FFT) circuits, that perform an FFT calculation respectively on the first and second sequences to generate two FFT results; a multiplier, that multiplies the two FFT results to generate a multiplication result; and an inverse Fast Fourier transform (IFFT) circuit, that performs an IFFT calculation on the multiplication result to generate a correlation value. By performing a correlation calculation on multiple offsets n between the first sequence and the second sequence, a plurality of correlation values can be generated.

The phase difference estimating circuit 630 estimates a phase difference (denoted as PD in the diagram) between the first and second frames according to the plurality of correlation values. For example, the phase difference estimating circuit 630 performs the calculation of step S340. In one embodiment, the phase difference estimating circuit 630 includes: a square or absolute value calculating circuit, that generates squares or absolute values of the correlation values; and a maximum generating circuit, that identifies a maximum of the squares or absolute values of the correlation values to accordingly determine the phase difference between the first and second frames.

Figure 7:
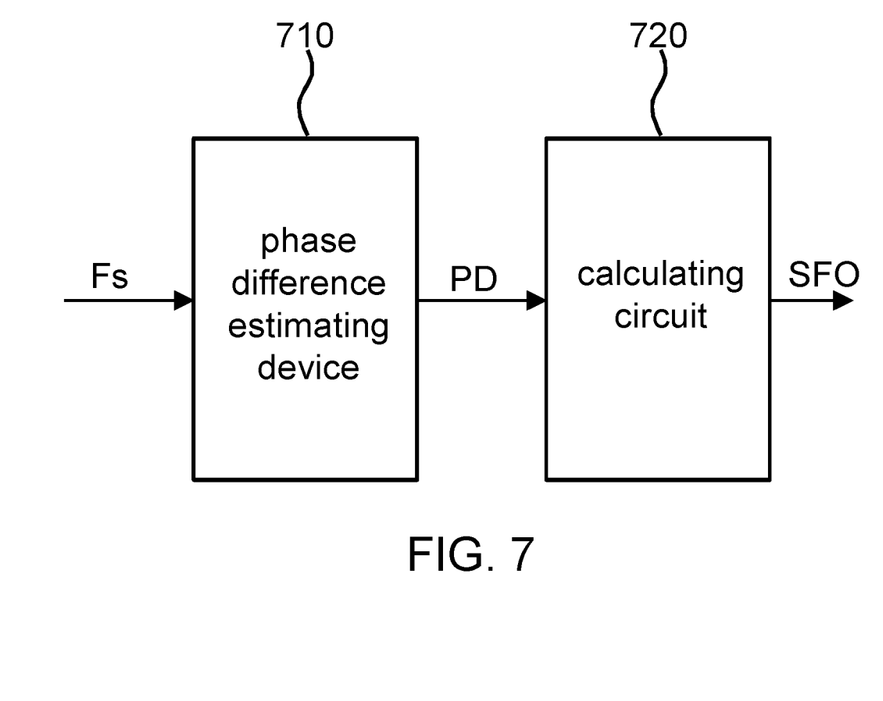
FIG. 7 is a schematic diagram of an SFO calculating device according to an embodiment of the present invention.

FIG. 7 shows a schematic diagram of an SFO calculating device 700 according to an embodiment of the present invention. The SFO calculating device 700 includes a phase difference estimating device 710 and a calculating circuit 720. The phase difference estimating device 710 generates phase differences (denoted as PD in the diagram) of all successive frames of a plurality of frames (denoted as Fs in the diagram). The header of each of the frames includes a sequence, and the sequences have different phases but the same contents. The phase difference estimating device 710 according to an embodiment of the present invention is as shown in FIG. 6. The calculating circuit 720 calculates a sampling frequency offset (SFO) (denoted as SFO in the diagram) according to the phase differences of all successive frames of the frames. For example, the calculating circuit 720 may be one single circuit (e.g., a programmable processor), or a combination of a plurality of logic circuits, which performs the calculation of step S420.

Figure 8:
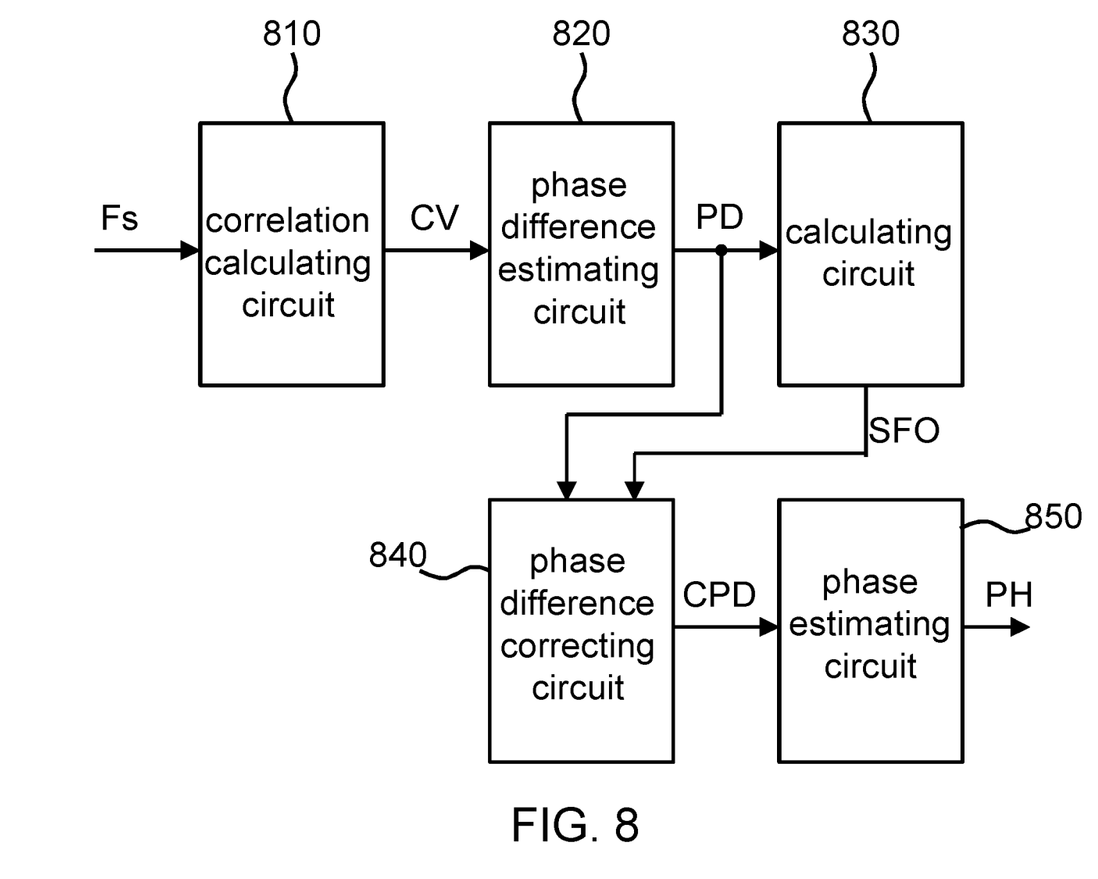
FIG. 8 is a schematic diagram of a phase estimating device according to an embodiment of the present invention.

FIG. 8 shows a schematic diagram of a phase estimating device 800 according to an embodiment of the present invention. The phase estimating device 800 includes a correlation calculating circuit 810, a phase difference estimating circuit 820, a calculating circuit 830, a phase difference correcting circuit 840, and a phase estimating circuit 850. The correlation calculating circuit 810 performs a correlation calculation according to headers of every two successive frames of a plurality of frames (denoted as Fs in the diagram) to accordingly generate a plurality of correlation values (denoted as CV in the diagram). For example, the correlation calculating circuit 810 is the correlation calculating circuit 620 in FIG. 6, or a combination of the correlation calculating circuit 620 and the sequence generating circuit 610. The phase difference estimating circuit 820 estimates the phase differences (denoted as PD in the diagrams) between every two successive frames of the plurality of frames according to the correlation values. For example, the phase difference estimating circuit 820 is the phase difference estimating circuit 630 in FIG. 6. The calculating circuit 830 calculates an SFO (denoted as SFO in the diagram) according to the phase differences of all successive frames and the number of the phase differences. For example, the calculating circuit 830 is the calculating circuit 720 in FIG. 7. The phase difference correcting circuit 840 subtracts the SFO from the phase differences of all successive frames of the plurality of frames to accordingly obtain a plurality of corrected phase differences (denoted as CPD in the diagram). For example, the phase difference correcting circuit 840 is a subtraction circuit that performs step S540. The phase estimating circuit 850 calculates the phase (denoted as PH in the diagram) of each of the plurality of frames according to the plurality of corrected phase differences. For example, the phase estimating circuit 850 is one single circuit (e.g., a programmable processor), or a combination of a plurality of logic circuits, and performs step S550.

In conclusion, the phase difference estimating method and device, the SFO calculating method and device, and the phase estimating method and device of the present invention perform estimation and calculation by novel approaches, and can be collaboratively applied to achieve implementation effects or independently applied according to applicator needs. In short, the present invention attends to both cost considerations and application feasibility, and provides one person skilled in the art with a competitive solution.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An estimating method, applied to a signal receiver, the signal receiver receiving a received signal comprising a plurality of frames, the estimating method comprising:
   providing a first sequence according to a header of a first frame of the frames;
   providing a second sequence according to a second frame of the frames, wherein the first frame and the second frame are successive frames, and the first sequence and the second sequence are pseudo noise sequences;
   performing a correlation calculation according to the first sequence and the second sequence to accordingly generate a plurality of correlation values;
   estimating a phase difference between the first frame and the second frame according to the correlation values;
   calculating a sampling frequency offset (SFO) according to the phase differences between every two successive frames of the frames;
   obtaining a phase of the first frame according to the SFO and the phase difference between the first frame and the second frame; and
   determining whether a carrier frequency offset (CFO) is lower than a threshold;
   wherein the step of performing a correlation calculation according to the first sequence and the second sequence to accordingly generate a plurality of correlation values is performed when the CFO is lower than the threshold.

2. The estimating method according to claim 1, wherein the step of calculating the SFO comprises:
   calculating a bias according to theoretical phase differences between every two successive frames of the frames; and
   calculating the SFO according to the phase differences between every two successive frames and the bias.

3. The estimating method according to claim 2, wherein the step of calculating the SFO according to the phase differences between every two successive frames and the bias comprises:
   subtracting the bias from a sum of the phase differences between every two successive frames to obtain a difference; and
   dividing the difference by the number of the phase differences between every two successive frames to obtain the SFO.

4. The estimating method according to claim 1, wherein the step of providing the first sequence comprises:
   up-sampling at least a part of the header of the first frame to generate a first up-sampled sequence; and
   generating the first sequence according to the first up-sampled sequence;
   wherein the step of providing the second sequence comprises:
   up-sampling at least a part of the header of the second frame to generate a second up-sampled sequence; and
   generating the second sequence according to the second up-sampled sequence.

5. A phase estimating method, applied to a signal receiver, the signal receiver receiving a received signal comprising a plurality of frames, the phase estimating method comprising:
   estimating phase differences between every two successive frames of the frames;
   calculating a sampling frequency offset (SFO) according to the phase differences;
   correcting the phase differences according to the SFO to obtain a plurality of corrected phase differences; and
   determining a phase of each of the frames according to the corrected phase differences,
   wherein the step of calculating the SFO comprises:
   calculating a bias according to theoretical phase differences between every two successive frames of the frames; and
   calculating the SFO according to the phase differences and the bias.

6. The phase estimating method according to claim 5, wherein the header of each of the frames comprises a sequence, and the sequences have different phases but same contents.

7. A phase estimating device, applied to a signal receiver, the signal receiver receiving a received signal comprising a plurality of frames, the phase estimating device comprising:
   a phase difference estimating circuit, that estimates phase differences between every two successive frames of the frames;
   a calculating circuit, that calculates a sampling frequency offset (SFO) according to the phase differences;
   a phase difference correcting circuit, that corrects the phase differences according to the SFO to obtain a plurality of corrected phase differences; and
   a phase estimating circuit, that calculates a phase of each of the frames according to the corrected phase differences,
   wherein the calculating circuit calculates a bias according to theoretical phase differences between every two successive frames of the frames, and calculates the SFO according to the phase differences and the bias.

8. The phase estimating device according to claim 7, wherein the header of each of the frames comprises a sequence, and the sequences have different phases but same contents.

9. A sampling frequency offset (SFO) calculating method, comprising:
   generating phase differences between every two successive frames of a plurality of frames, wherein a header of each of the frames comprises a sequence, and the sequences have different phases but same contents; and
   calculating a sampling frequency offset (SFO) according to the phase differences,
   wherein the step of calculating the SFO comprises:
   calculating a bias according to theoretical phase differences between every two successive frames of the frames; and calculating the SFO according to a sum of the phase differences and the bias.

10. The SFO calculating method according to claim 9, wherein the sequences are pseudo noise sequences.

* * * * *